(12) United States Patent
Chen et al.

(10) Patent No.: US 7,568,828 B2
(45) Date of Patent: Aug. 4, 2009

(54) LIGHT GUIDE PLATE WITH COMPENSATED EMISSION LIGHT FIELD

(75) Inventors: Wei-Hsuan Chen, Kaohsiung (TW); Pei-Ling Kao, Kaohsiung (TW); Chun-Hsien Li, Kaohsiung (TW)

(73) Assignee: Radiant Opto-Electronics Corp., Kaohsiung (TW)

( * ) Notice: Subject to any disclaimer, the term of this patent is extended or adjusted under 35 U.S.C. 154(b) by 0 days.

(21) Appl. No.: 11/934,795

(22) Filed: Nov. 5, 2007

(65) Prior Publication Data

US 2009/0116263 A1    May 7, 2009

(51) Int. Cl.
  *F21V 7/04*    (2006.01)
(52) U.S. Cl. .................. 362/626; 362/614; 362/620
(58) Field of Classification Search ........... 362/330, 362/339, 614, 615, 621, 623, 625, 626, 628, 362/331, 332, 620
  See application file for complete search history.

(56) References Cited

U.S. PATENT DOCUMENTS 7,097,341 B2 *   8/2006   Tsai .......................... 362/625
7,178,966 B2 *   2/2007   Yu et al. ..................... 362/626
2008/0008434 A1 * 1/2008   Lee et al. .................... 362/615

* cited by examiner

*Primary Examiner*—Y My Quach Lee
(74) *Attorney, Agent, or Firm*—Leong C. Lei

(57) ABSTRACT

A light guide plate includes a light incidence surface, a light reflection surface, and a light emission surface. The light reflection surface forms a plurality of light-guiding structures extending in a direction substantially parallel to a light source. The light reflection surface has an edge margin section adjacent to the light incidence surface and having opposite end zones each containing auxiliary light-guiding structures that extend in a direction substantially perpendicular to the light source and has an irregular V-shaped cross-section defined by a long inclined side, which faces endwise, and a short inclined side. The auxiliary light-guiding structures are distributed from a densest condition at each end portion toward a sparsest condition at a middle portion of the edge margin section. The long side helps to redirect a greater amount of light to a desired light emission direction thereby enhancing uniformity of light emission of the light guide plate.

2 Claims, 6 Drawing Sheets

LIGHT GUIDE PLATE WITH COMPENSATED EMISSION LIGHT FIELD

BACKGROUND OF THE INVENTION (a) Technical Field of the Invention

The present invention relates to a light guide plate, and in particular to a light guide plate that compensates and correct a light field generated therein to enhance uniformity of light emission thereof.

(b) Description of the Prior Art

As shown in FIG. 1 of the attached drawings, conventionally, a light guide plate 1 comprises a light incidence surface 11, a light reflection surface 12, and a light emission surface 13. The light incidence surface 11 receives the incidence of light from a mated light source A, which is often a linear light source coextensive with the light incidence surface 11 of the light guide plate 1. The light gets into the light guide plate 1 through the light incidence surface 11 and transmits deeply into the light guide plate 1. A portion of the light that transmits into the light guide plate 1 reaches the light reflection surface 12 at which the portion of the light is reflected toward the light emission surface 13. To enhance convergence of the light, both the light emission surface 13 and the light reflection surface 12 are provided with parallel and elongated light-guide structures 131, 121, which are composed of raised ribs having V-shaped cross-sections. The light-guide structures 131 of the light emission surface 13 are extended in a direction substantially normal to the linear light source A, while the light-guiding structures 121 of the light reflection surface 12 are substantially parallel to the light source A. With this arrangement, when transmitting through or reflected by or otherwise interacting with side faces of the rib-like light-guiding structures 131, 121 to leave the light guide plate 1, can realize multi directional light convergence.

Such a conventional structure of light guide plate, although effective in realizing multidirectional light convergence, still suffers drawbacks. This is due to the fact that when the light source A gives off light, divergence angles of the light occur at opposite ends of the light source A, as shown in FIGS. 2 and 3, so that when the light enters the light guide plate 1, the distribution of light field close to the opposite ends of the light guide plate 1, which correspond to the ends of the light source A, shifts toward the ends. This prevents the V-shaped light-guiding structures 121 of the light reflection surface 12 from providing the optimum performance over the shifted light field and consequently, the coordination between the light reflection surface 12 with the light emission surface 13 to ensure excellent light emission cannot be achieved, which leads to poor overall light emission of the light guide plate 1.

In view of the above discussed drawback, it is desired to provide a light guide plate that compensates the drawback caused by the light divergence angle of the light source.

SUMMARY OF THE INVENTION

The primary purpose of the present invention is to provide a light guide plate that overcomes the problem that divergence angles are induced at lengthwise ends of a light source that provides light to the light guide plate and cause end portions of light field within the light guide plate to shift endwise, leading to poor performance of the light emitted from the light guide plate.

To realize the above objective of the present invention, a light guide plate is provided, comprising a light incidence surface, a light reflection surface, and a light emission surface. The light reflection surface forms a plurality of light-guiding structures that extend in a direction substantially parallel to a lengthwise direction of a light source. The light reflection surface has an edge margin section adjacent to the light incidence surface and having opposite end zones each containing auxiliary light-guiding structures that extend in a direction substantially perpendicular to the lengthwise direction of the light source and has an irregular V-shaped cross-section defined by a long inclined side, which faces endwise, and a short inclined side. The long side provides the auxiliary light-guiding structure with a side face that has a greater surface area to facilitate redirection of a greater amount of light to a desired light emission direction and thus enhancing uniformity of light emission of the light guide plate.

In another aspect of the present invention, a light guide plate is provided, comprising a light reflection surface having an edge margin section having opposite end zones in which auxiliary light-guiding structures are provided. The auxiliary light-guiding structures are distributed from a densest condition at each end portion toward a sparsest condition at a middle portion of the edge margin section to provide the optimum light interaction between the light source and the light guide plate.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
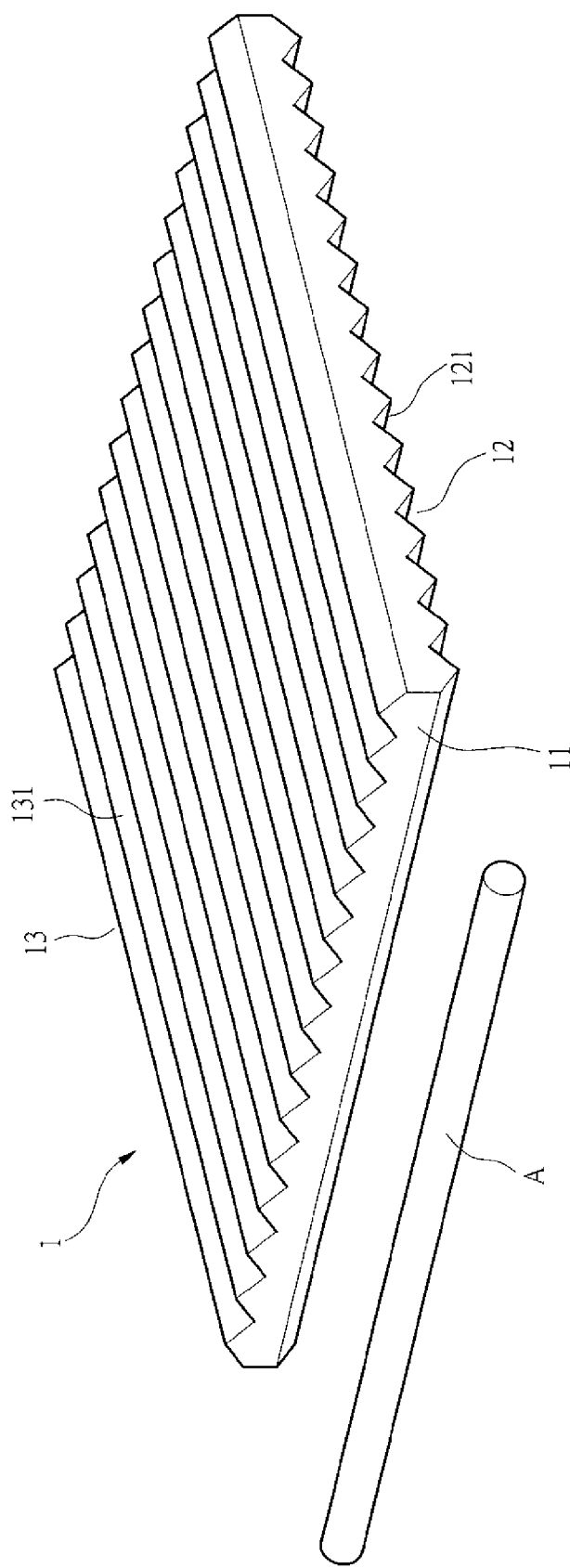
FIG. 1 is a perspective view of a conventional light guide plate, together with a light source that provides light to the light guide plate.
Figure 2:
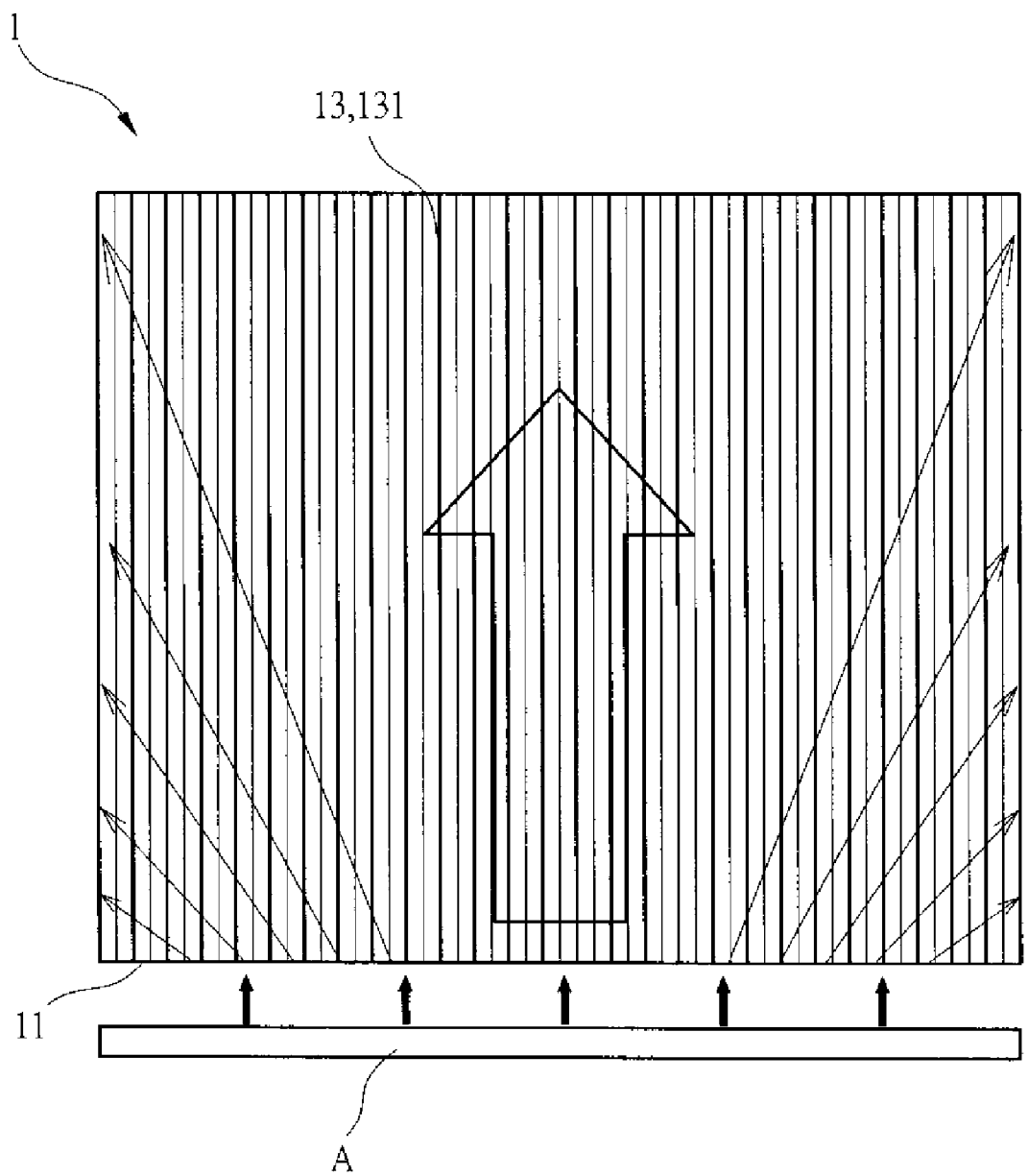
FIG. 2 is a plan view schematically illustrating transmission of light within the conventional light guide plate.
Figure 3:
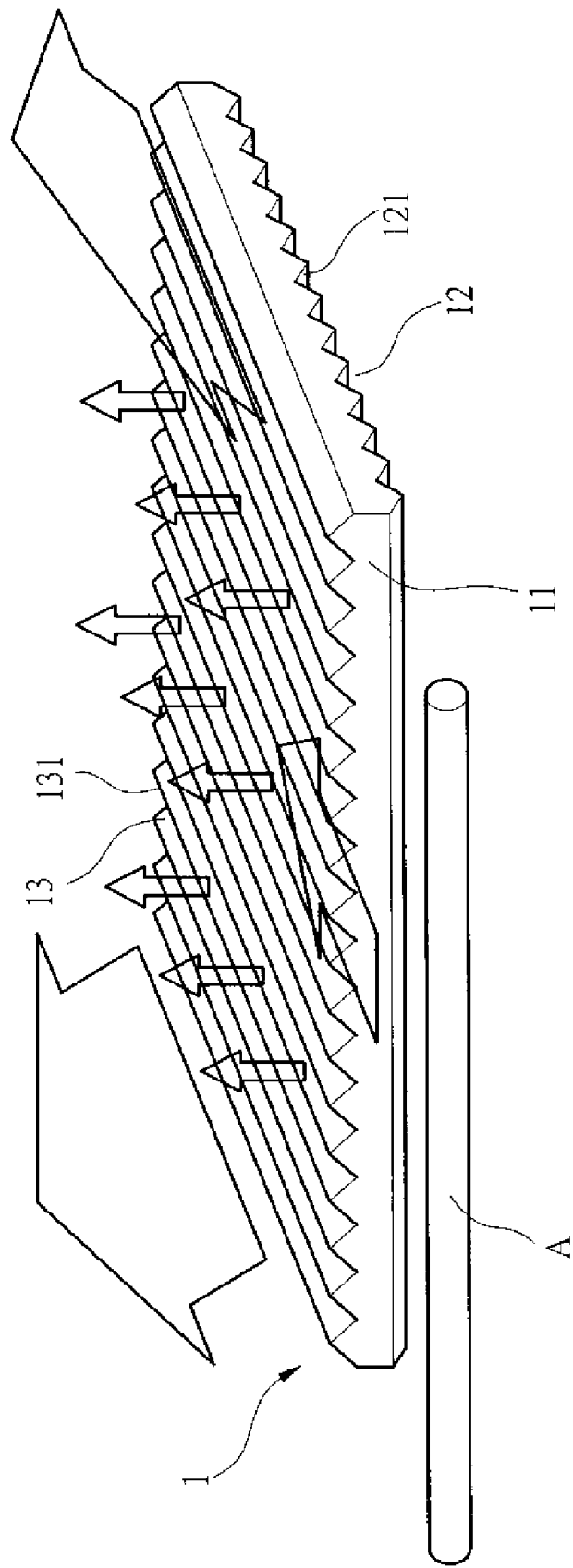
FIG. 3 is a perspective view illustrating an emission light field generated by the conventional light guide plate.
Figure 4:
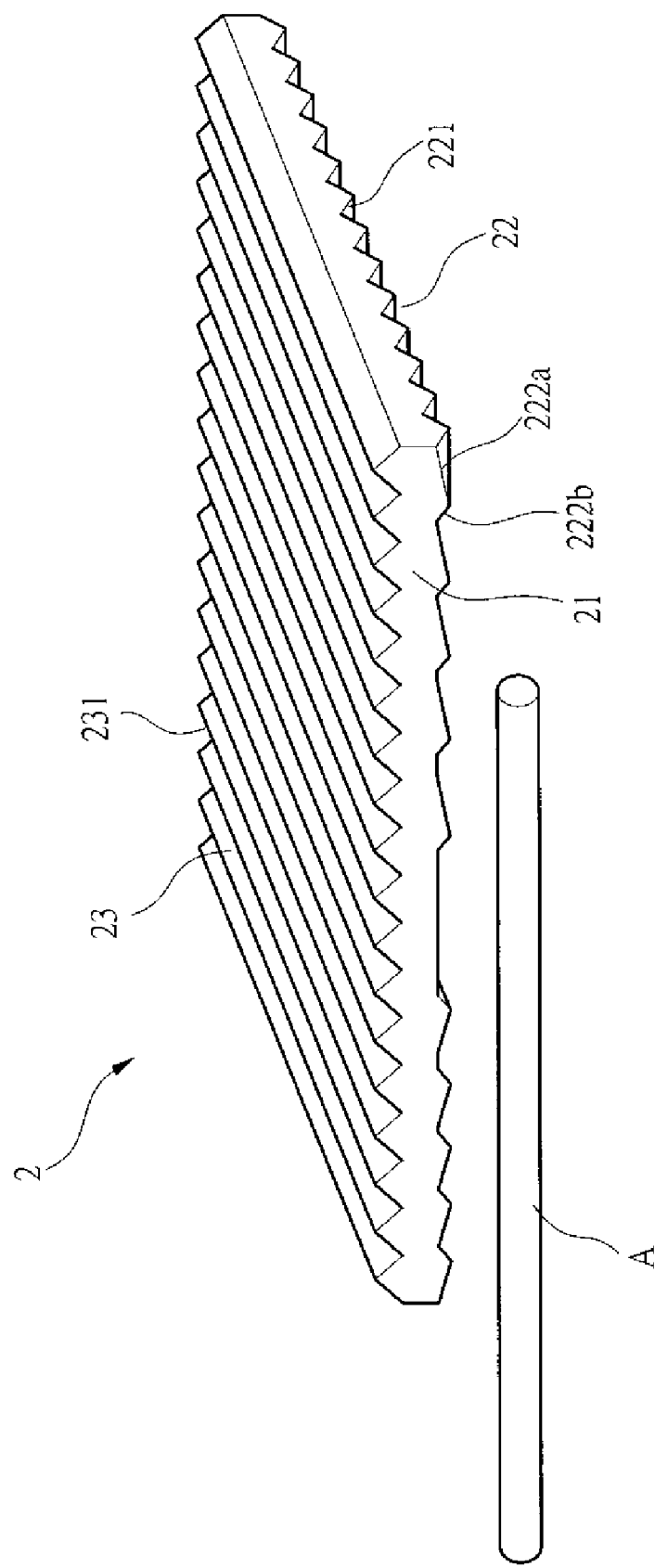
FIG. 4 is a perspective view showing a light guide plate constructed in accordance with the present invention, together with a light source that provides light to the light guide plate.

With reference to the drawings and in particular to FIG. 4, a light guide plate constructed in accordance with the present invention, generally designated with reference numeral 2, comprises a light incidence surface 21, a light reflection surface 22, and a light emission surface 23.

The light incidence surface 21 is arranged to receive light emitted from a light source A, which in the embodiment illustrated is an elongate lamp tube having a lengthwise direction. The light from the light source A enters the light guide plate 2 through the light incidence surface 21 and travels deeply into the light guide plate 2.

The light reflection surface 22 constitutes one of the major surfaces of the light guide plate 2 and is adjacent to the light incidence surface 21. Formed on the light reflection surface 22 is a plurality of light-guiding structures 221, which are elongate raised projections or ribs having a substantially V-shaped cross-section, which has opposite inclined sides, and extending in a direction substantially parallel to the lengthwise direction of the light source A, and are preferably parallel to each other and. The light reflection surface 22 has an edge margin section (not labeled) immediately adjacent to the light incidence surface 21. The edge margin section has opposite end zones in the lengthwise direction, respectively corresponding to the opposite lengthwise ends of the light source A. Formed in each of the end zones is an auxiliary light-guiding structure 222, which is an elongate raised projection or rib extended in a direction substantially perpendicular to the lengthwise direction of the light source A and each having an irregular V-shaped cross-section defined by a first, long inclined side 222a, which is facing endwise in the lengthwise direction and is thus located closer to the lengthwise end of the light reflection surface 22, and a second, short inclined side 222b, which is substantially opposite to the first side 222a and is located away from the end of the light reflection surface 22. In accordance with the present invention, the long inclined side 222a has a length greater than that of the short inclined side 222b. The long side 222a of each auxiliary light-guiding structure 222 provides a side surface of the auxiliary light-guiding structure 222 with a greater surface area than that of the short side 222b, in order to facilitate reflection of light.

Further, in case that each lengthwise end zone of the edge margin section of the light reflection surface 22 contains a plurality of auxiliary light-guiding structures 222 that are preferably distributed in the lengthwise direction along the edge margin section of the light reflection surface 22, it is preferable that the distribution of the auxiliary light-guiding structures in each end zone is such that the auxiliary light-guiding structures get denser in a direction toward the corresponding lengthwise end of the edge margin section and the distribution gets sparser in a direction away from the end and approaching a middle portion of the edge margin section. In other words, the "linear density" of the auxiliary light-guiding structures, which indicates the number of the auxiliary light-guiding structures of each unit length along the edge margin section, gradually changes from the densest condition at each lengthwise end of the edge margin section toward a sparsest condition at the middle of the edge margin section.

The light emission surface 23 constitutes an opposite one of the major surfaces of the light guide plate 2, which is opposite to the light reflection surface 22 and is adjacent to the light incidence surface 21. Formed on the light emission surface 23 is a plurality of light-guiding structures 231, which are elongate raised projections or ribs each having a substantially V-shaped cross-section, which has opposite inclined sides, and extending in a direction substantially perpendicular to the lengthwise direction of the light source A, and are preferably parallel to each other.

Figure 5:
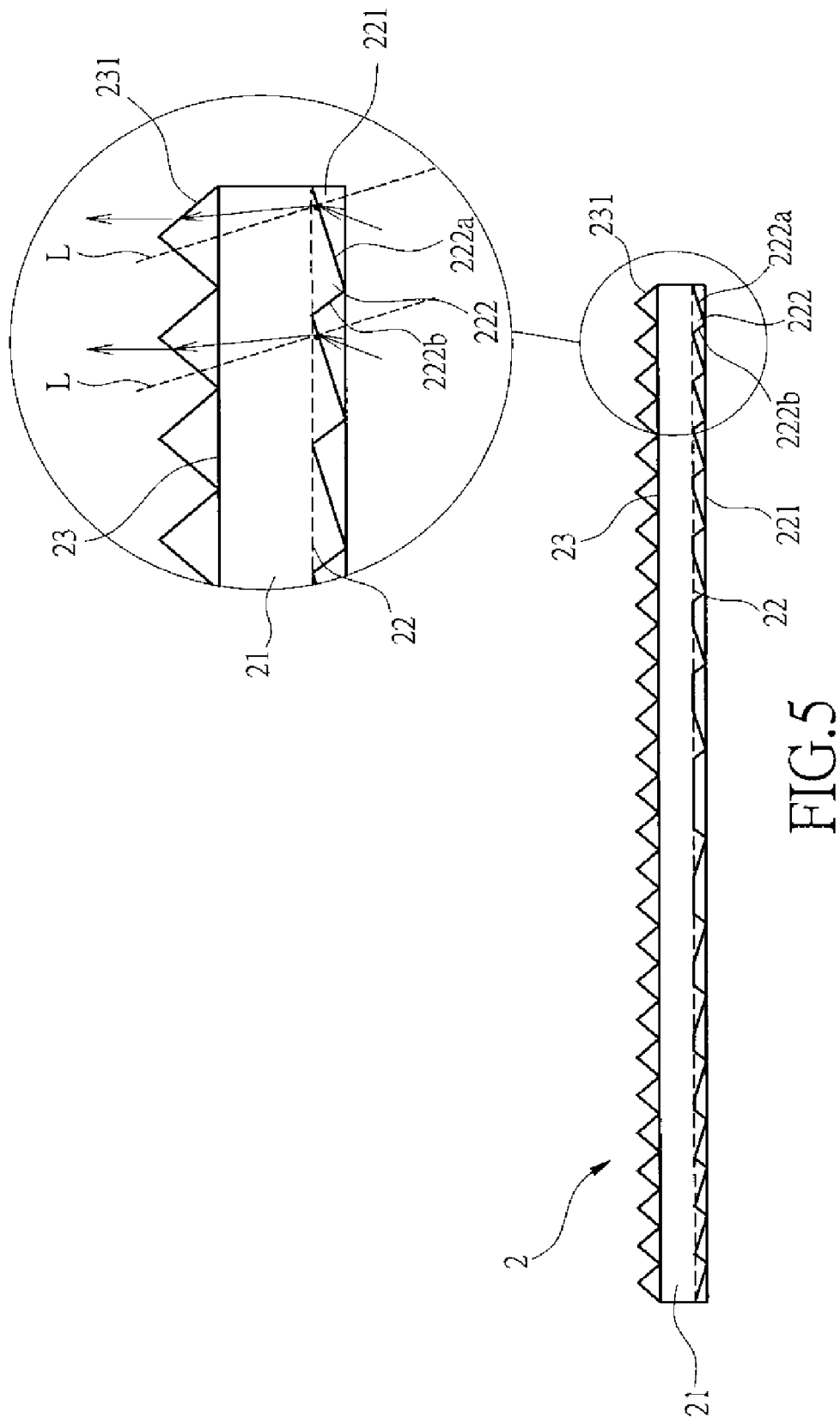
FIG. 5 is a side elevational view of the light guide plate in accordance with the present invention, with a portion thereof being separately magnified to illustrate transmission of light through the light guide plate.

In a practical application, as shown in FIG. 5, light is emitted from the light source A and enters the light guide plate 2 through the light incidence surface 21. A portion of the light entering the light guide plate 2 reaches the light reflection surface 22 and is reflected by the light reflection surface 22 toward the light emission surface 23. With the light-guiding structures or ribs 231 of the light emission surface 23 substantially perpendicular to the lengthwise direction of the light source A and the light-guiding structures or ribs 221 of the light reflection surface 22 substantially parallel to the lengthwise direction of the light source A, when the light transmits through or reflected by or otherwise interacts with the inclined sides of the V-shaped light-guiding structures or ribs 231, 221 to leave the light guide plate 2, multi-directional convergence of the light can be realized.

Figure 6:
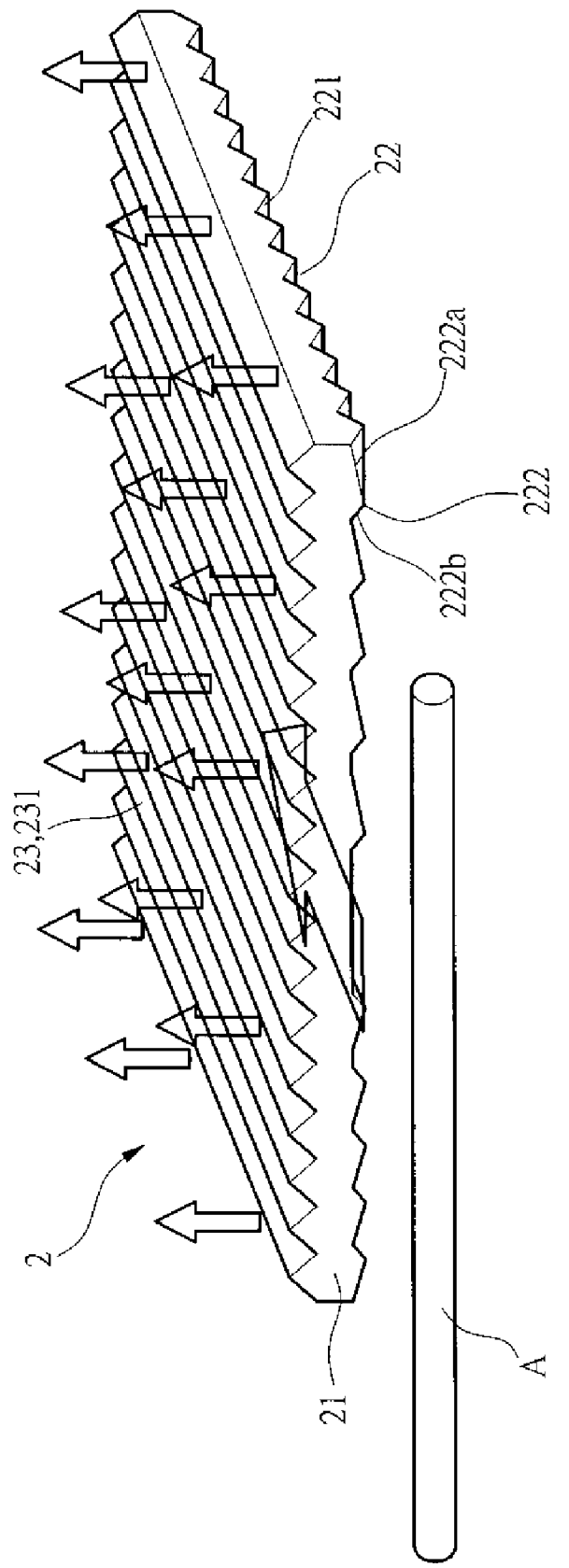
FIG. 6 is a perspective view illustrating an emission light field generated by the light guide plate of the present invention.

In addition, in accordance with the present invention, the auxiliary light-guiding structures 222 are provided at the end zones of the edge margin section of the light reflection surface 22 and extend in a direction substantially perpendicular to the lengthwise direction of the light source A. Each of the auxiliary light-guiding structure 222 has a long inclined side 222a and a short inclined side 222b and further, the distribution of the auxiliary light-guiding structures 222 is such that the linear density of the auxiliary light-guiding structures 222 changes from the densest condition at the lengthwise ends of the edge margin section toward the sparsest condition at the middle of the edge margin section. Thus, when light gets incident to and is reflected by the reflection surface 22, the light is partially incident to the long inclined side 222a of the auxiliary light-guiding structure 222 and is refracted toward the normal L of the long side 222a to thereby facilitate redirection of the light to travel in a desired light emission direction. The long side 222a of the auxiliary light-guiding structure 222 provides an increased surface area of the side face of the auxiliary light-guiding structure 222, which facilitates to redirect a greater amount of light toward the desired light emission direction by which the light emits from the light guide plate 2. In this way, the non-uniformity or shifting of light field caused by the divergence angles at the ends of the light source A can be compensated as being corrected by the auxiliary light-guiding structures 222. This provides a better interaction of the reflected light with the light-guiding structures 231 of the light emission surface 23 to enhance uniformity of light emission, as shown in FIG. 6. The effectiveness of the present invention is that the auxiliary light-guiding structures 222 are provided at the opposite end zones of the edge margin section of the light reflection surface 22 of the light guide plate 2; and further, the auxiliary light-guiding structures 222 are substantially perpendicular to the lengthwise direction of the light source A and each comprises a long inclined side 222a and a short inclined side 222b. With such an arrangement, the long inclined side 222a of the auxiliary light-guiding structures 222 serve to redirect and thus correct the traveling direction of the light emitted from the light source A, which is made non-uniformity by the divergence angles at the ends of the light source A, toward the desired light emission direction, thereby facilitating interaction of the light with the light-guiding structures 231 of the light emission surface 23 to enhance the uniformity of light emission of the light guide plate 2. Further, since the shifting of light field in the middle portion of the light guide plate 2 is not so severe as that at the end portions, it is preferable that the distribution of the auxiliary light-guiding structures is such that the linear density of the auxiliary light-guiding structures changes from the densest condition at the ends to the sparsest condition of the middle portion, in order to correspond to the emission light field of the light guide plate 2. Thus, the light guide plate of the present invention is effective in compensating shifting of light field and correcting the light emission direction to thereby enhance uniformity of light emission and brightness of the light emitted from the light guide plate of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A light guide plate comprising:

a light incidence surface;

a light reflection surface having a plurality of light-guiding structures which are elongate raised projections, said elongate raised projections having a V-shaped cross-section and extending in a direction parallel to a lengthwise direction of a light source and parallel to each other, said light reflection surface having an edge margin section immediately adjacent to said light incidence surface, said edge margin section having opposite end zones in a lengthwise direction respectively corresponding to opposite lengthwise ends of said light source, each of said end zones being formed with a plurality of auxiliary light-guiding structures which are elongate raised projections extending in a direction perpendicular to the lengthwise direction of said light source, each of said elongated raised projections having an irregular V-shaped cross-section defined by a first inclined side and a second inclined side, said first inclined side being longer in said lengthwise direction than said second inclined side, said first inclined side facing endwise in the lengthwise direction and being located closer to a lengthwise end of said light reflection surface, said second inclined side being opposite to said first side and located away from an end of said light reflection surface, said long side providing a side surface with a greater area than that of said short side; and a light emission surface which is opposite to said light reflection surface and adjacent to said light incidence surface, said light emission surface having a plurality of light-guiding structures which are elongate raised projections each having a V-shaped cross-section and extending in a direction perpendicular to a lengthwise direction of said light source and parallel each other.

2. The light guide plate as claimed in claim 1, wherein said auxiliary light-guiding structures of said end zones are distributed from a densest condition at an end portion of said light reflection surface to a sparest condition at a middle portion of said light reflection surface.

\* \* \* \* \*